(12) United States Patent
Sharp

(10) Patent No.: US 12,071,205 B2
(45) Date of Patent: Aug. 27, 2024

(54) EMISSIONS CONTROL WATERCRAFT

(71) Applicant: Robert John Sharp, Camarillo, CA (US)

(72) Inventor: Robert John Sharp, Camarillo, CA (US)

( * ) Notice: Subject to any disclaimer, the term of this patent is extended or adjusted under 35 U.S.C. 154(b) by 220 days.

(21) Appl. No.: 17/157,982

(22) Filed: Jan. 25, 2021

(65) Prior Publication Data

US 2021/0171164 A1 Jun. 10, 2021
US 2022/0411029 A9 Dec. 29, 2022

Related U.S. Application Data

(63) Continuation-in-part of application No. 16/385,906, filed on Apr. 16, 2019, now Pat. No. 10,970,927, and
(Continued)

(51) Int. Cl.
| | |
|---|---|
| B63B 35/00 | (2020.01) |
| B63B 21/30 | (2006.01) |
| B63B 21/50 | (2006.01) |
| B63B 35/28 | (2006.01) |
| B63B 35/44 | (2006.01) |
| B63H 11/00 | (2006.01) |
| B63H 21/14 | (2006.01) |

(Continued)

(52) U.S. Cl.
CPC .............. *B63B 35/44* (2013.01); *B63B 21/30* (2013.01); *B63B 21/502* (2013.01); *B63B 35/28* (2013.01); *B63H 11/00* (2013.01); *B63H 21/14* (2013.01); *B63H 21/165* (2013.01); *B63H 21/17* (2013.01); *B63H 21/32* (2013.01); *F01N 3/2013* (2013.01); *B63B 2209/18* (2013.01)

(58) Field of Classification Search
CPC ....... B63B 35/44; B63B 21/30; B63B 21/502; B63B 35/28; B63B 2209/18; B63H 11/00; B63H 21/14; B63H 21/165; B63H 21/17; B63H 21/32; F01N 3/2013
USPC .......................................................... 95/291
See application file for complete search history.

(56) References Cited

U.S. PATENT DOCUMENTS

| | | | | |
|---|---|---|---|---|
| 1,404,525 | A * | 1/1922 | Hotchkiss | ................. F04D 1/04 |
| | | | | 415/208.2 |
| 3,585,806 | A * | 6/1971 | Lawrence | ............... B63B 35/03 |
| | | | | 405/166 |

(Continued)

OTHER PUBLICATIONS

California Air Resources Board, Appendix C-1, Proposed Control Measure for Ocean-Going Vessels at Berth, Standardized Regulatory Impact Assessment (SRIA), Aug. 1, 2019, Air Resources Board, Sacramento, California.
(Continued)

*Primary Examiner* — Steven O Douglas

(57) ABSTRACT

A novel emissions control watercraft (STAXcraft) solving a long-felt but unsolved need regarding disadvantages associated with prior-art emissions servicing watercraft, the disadvantages selected from the group, but not limited to, the use of tugboats, securing or mooring servicing watercraft to a serviced vessel, additional expenses and time-delays and inefficiencies of land-based approaches, increased toxic emissions, increased greenhouse gases (GHG) emissions, danger from falling cargo, tanker safety, alongside mooring in narrow channels preventing other OGV's to pass safely, and cargo tank emissions.

27 Claims, 8 Drawing Sheets

Related U.S. Application Data a continuation-in-part of application No. 16/253,202, filed on Jan. 21, 2019, now Pat. No. 10,953,960.

(60) Provisional application No. 62/635,393, filed on Feb. 26, 2018, provisional application No. 62/620,183, filed on Jan. 22, 2018.

(51) Int. Cl.
  *B63H 21/165* (2006.01)
  *B63H 21/17* (2006.01)
  *B63H 21/32* (2006.01)
  *F01N 3/20* (2006.01)

(56) References Cited

U.S. PATENT DOCUMENTS

| | | | | |
|---|---|---|---|---|
| 3,749,162 A * | 7/1973 | Anders | | E21B 7/12 |
| | | | | 114/40 |
| 3,938,676 A * | 2/1976 | Croese | | B63B 35/44 |
| | | | | 414/138.6 |
| 4,112,863 A * | 9/1978 | Nelson | | B63B 25/28 |
| | | | | 212/304 |
| 4,361,104 A * | 11/1982 | Lloyd, III | | B63B 39/03 |
| | | | | 212/308 |
| 4,828,033 A * | 5/1989 | Frison | | B67D 7/002 |
| | | | | 166/292 |
| 8,402,746 B2 * | 3/2013 | Powell | | B08B 15/00 |
| | | | | 60/284 |
| 9,089,806 B2 * | 7/2015 | Powell | | B63H 21/32 |
| 2006/0213197 A1 * | 9/2006 | Caro | | B08B 15/02 |
| | | | | 60/685 |
| 2008/0237173 A1 * | 10/2008 | Altman | | B63B 35/00 |
| | | | | 212/347 |
| 2015/0337759 A1 * | 11/2015 | Lehmann | | H02J 4/00 |
| | | | | 290/2 |
| 2016/0252030 A1 * | 9/2016 | Hagiwara | | F02M 21/0215 |
| | | | | 123/253 |
| 2016/0368567 A1 * | 12/2016 | Westerweel | | B63B 35/28 |

OTHER PUBLICATIONS

Proposed Control Measure for Ocean-Going Vessels at Berth, Standardized Regulatory Impact Assessment (SRIA), Aug. 1, 2019, California Air Resources Board.

* cited by examiner

EMISSIONS CONTROL WATERCRAFT

CROSS-REFERENCE TO RELATED APPLICATIONS

This application claims the benefit of PPA Ser. No. 62/374,869 filed 2016 Aug. 14, Ser. No. 62/620,183 filed 2018 Jan. 22, Ser. No. 62/635,393 filed 2018 Feb. 26, all by the present inventor, which are all incorporated herein in their entirety by reference.

This application further claims the benefit of NP application Ser. No. 15/673,415 filed 2017 Aug. 9, Ser. No. 16/253,202 filed 2019 Jan. 21, Ser. No. 16/385,906 filed 2019 Apr. 16, all by the present inventor, which are all incorporated herein in their entirety by reference.

SEQUENCE LISTING

None.

FEDERALLY SPONSORED RESEARCH

None.

FIELD OF THE INVENTION

The invention relates to an emission control watercraft, and in particular, an airborne emissions control system for engines, boilers, and cargo tank vents on oceangoing vessels at berth or at anchor.

BACKGROUND OF THE INVENTION

Government regulations that limit emissions from ocean-going vessels (OGV's) are becoming ever more restrictive. For example, the California Air Resources Board's (CARB) At-Berth Regulation requires that OGV's use emission control servicing watercraft, also known as barge-based capture & control systems, when at-berth. The need to reduce OGV emissions is constantly increasing. However, despite increasing demand, the number of emissions control watercrafts implemented has been limited due to disadvantages described below. Those skilled in the art have demonstrated that they have not been able to overcome these disadvantages.

OGV's typically operate in two modes: 1) underway and 2) at-berth. When the OGV is underway, the main engine is operating to propel the OGV through the water. When the OGV is at-berth, the main engine is shut down. In both modes, however, at least one auxiliary engine operates to provide electrical power for the vessels' electrical systems. Furthermore, in both modes, at least one boiler is operating to provide heat and power. Furthermore, some OGV's produce emissions from vented cargo tanks which may be connected to inert gas systems. Each OGV is typically equipped with several auxiliary engines, and at least one boiler, although not all are operated concurrently. Emissions from OGV's at-berth and at anchorage are significantly more harmful than emissions from vessels that are travelling on the ocean because the at-berth emissions such as PM, NOx, and SOx occur near populated areas.

A comprehensive assessment by the California Air Resources Board (CARB) titled "Proposed Control Measure for Ocean-Going Vessels At Berth, Standardized Regulatory Impact Assessment (SRIA), which was released on Aug. 1, 2019, is hereby incorporated by reference in its entirety. The SRIA was extremely thorough in its determination of the art at the time of publication, as stated on pages 40-48, "CARB staff conducted more than 60 individual meetings with . . . vessel operators, ports, terminal operators, industry associations, alternative technology operators, U.S. Coast Guard, CSLC, and other agencies. Meeting formats included public workshops, work group meetings, community meetings, and individual meetings with stakeholders. Staff also held various meetings, teleconferences, and webinars with trade associations, technology providers, vessel operators, terminal operators, port authorities and the communities surrounding the seaports, to discuss staff's proposal and gather input and information. Staff toured many California seaports and marine terminal complexes to learn more about their individual business operations and understand the scope of challenges facing the industry and the surrounding community. Additionally, staff toured multiple vessels including bulk, container, tanker, and ro-ro vessels to learn about their unique layout and operational challenges. Staff held numerous meetings and teleconferences with industry associations, individual manufacturers, and groups of industry representatives to gather information and receive input on staff's proposal. Among the industry associations represented were Pacific Merchant Shipping Association, World Shipping Council, Western States Petroleum Association, California Association of Port Authorities, Cruise Lines International Association, and Chamber of Shipping (of United States and Canada). Discussions were also held with representatives from the International Longshore and Warehouse Union, who play a vital role in the shore power connection process for vessels calling at California seaports, manufacturers of engine and emissions reductions technologies for vessels, including MAN Diesel and Turbo, Wärtsilä, and Alfa Laval, and shore power equipment manufacturers including CAVOTEC. Throughout the regulatory process, staff also consulted with multiple government agencies, including U.S. EPA, U.S. Coast Guard, California Office of Spill Prevention and Response, California local air districts, CSLC, and Harbor Safety Committees in San Francisco, as well as Los Angeles and Long Beach. Additionally, staff is actively engaged with the alternative capture and control system manufacturers, Advanced Cleanup Technologies (Advanced Environmental Group or AEG) and Clean Air Engineering—Maritime." Thus, the SRIA may be considered a reliable resource for determining the extent of the prior-art relating to the present application and demonstrates that those literally "skilled in the art" have not been able to solve the many disadvantages listed herein.

The SRIA states on page 72 that "tanker vessels would likely use capture and control options at all tanker terminals statewide". Furthermore, on page 76, "staff assumes that tanker vessels would use land-based capture and control systems". Furthermore, on page 76, "they do not anticipate using barge-based capture and control systems due to safety considerations that include the hazards inherent in aligning a barge alongside a tanker". Furthermore, on page 77, "Based on the above information, staff concluded that land-side "bonnet"-type capture and control system would likely be used at all tanker terminals statewide". Furthermore, on page 100, "tanker vessels are assumed to use land-based capture and control system". Thus, the SRIA teaches that a barge-based capture and control system cannot be used for tankers, and that a land-based capture and control system is required.

Furthermore, the SRIA page 26 states, "The extended timeline for tankers takes into account that existing tanker terminals are designed with minimal wharf space, so most will need infrastructure improvements to handle the weight of new emissions control equipment, as well as additional piping and pilings." Thus, the SRIA is evidence that tankers require a land-based capture and control approach (not a barge-based approach) and that there are significant disadvantages of using a land-based capture and control technology, including expensive and time-consuming infrastructure improvements.

Land-based capture and control systems are much more expensive than barge-based capture and control systems as detailed in the SRIA, pages 81 to 85. To summarize, additional costs associated with the land-based version include feasibility, engineering, and permitting, modifying port and terminal plans, and infrastructure costs which are particularly more expensive for petroleum tanker berths. This additional cost is indicated on page 96, where the annualized cost for the tanker vessel type is $214,444,000 compared to the cost of all the other vessel types which range from $18,244,000 to $21,149,000, or roughly ten times as much. Thus, a barge-based capture and control system would be much preferred from a cost standpoint, however, those skilled in the art have not been able to provide a barge-based solution prior to the present application.

The SRIA states that, thus far (i.e., as of Aug. 1, 2019), there are only two emissions control (i.e., capture & control) barges have been put into service to reduce at-berth emissions (The SRIA, pages 14, 21, and 48). The SRIA, as well as U.S. Pat. No. 7,258,710 (Caro) teach an Unpowered Seagoing Barge (USB) [i.e., a servicing watercraft] is placed alongside [i.e., parallel with] a serviced watercraft . . . using tugs and a servicing watercraft is moored to (coupled to) a serviced watercraft. Thus, per both the SRIA and Caro, at least one tug moves an unpowered barge alongside (in parallel with) a serviced watercraft and is then secured to (coupled to) the serviced watercraft. Once secured, the emissions control watercraft connects to the serviced vessel's exhaust system to capture and convey harmful emissions to a purification system on the barge. Shortly before the serviced watercraft departs, the barge disconnects from the serviced watercraft's exhaust system, releases the mooring constraints, and is pulled away from the serviced watercraft using tugs.

The SRIA, page 22, states "Tanker vessel emissions make up the highest source of unregulated emissions from all vessels at berth statewide". Furthermore, the SRIA, page 22, states "Tanker boilers make up nearly 40 percent of NOx emissions, 75 percent of PM2.5 emissions, and over 80 percent of GHG emissions from tanker vessels". The SRIA goes on to state on page 28 that "more action is needed to further reduce DPM and the localized cancer risk in communities surrounding ports and marine terminals". Thus, the SRIA states the tremendous need to reduce emissions from vessels at berth.

Thus, all prior-art emissions control servicing watercraft (e.g., capture and control barges) suffer disadvantages listed below.

A first set of disadvantages (1-9) pertain to the use of tugboats (i.e., tugs).

The prior-art requires at least one tugboat to transport and position an emissions control watercraft alongside the serviced vessel. Tugboats add considerable expense and complication as discussed below.

Disadvantage 1: One disadvantage is that more watercraft trips are required if tugboats are used to move and position an emissions control watercraft. First, the emissions control watercraft itself must make a trip to the serviced vessel. Then, after the serviced vessel call is complete, the emissions control watercraft then travels away from the serviced vessel to its next destination, either to another serviced vessel or to a home berth, for example. When tugboats are used to move the emissions control watercraft, then each tugboat makes a first trip to accompany the emissions control watercraft, then a second trip to travel to the next tugboat destination. When the serviced vessel call is near completion, the tugboat makes a third trip to retrieve the emissions control watercraft, and then a fourth trip to move the emissions control watercraft to its next destination. Thus, each tugboat makes two trips for every one trip of an emissions control watercraft. Typically two tugboats are used per event, thereby resulting in ten watercraft trips per serviced vessel call, two for the emissions control watercraft, four for the first tugboat, and four for the second tugboat. Each additional watercraft trip adds expense.

Disadvantage 2: Another disadvantage is even more watercraft trips are required in some cases (even more than the above ten trips). Sometimes events occur that require moving the emissions control watercraft during a serviced vessel's stay, such as emergencies and repositioning of the emissions control watercraft. Each of these events typically requires two tugboats, and two vessel trips per tugboat, resulting in four additional vessel trips per additional event. Each additional tugboat trip adds expense, reduces operational flexibility, and causes delays.

Disadvantage 3: Yet another disadvantage is that the tugboat vessel trips described above cause additional emissions. In the case of emissions control watercraft, it is counter-productive to use tugboats which themselves produce significant emissions while moving the servicing watercraft. Tugboats reduce the overall effectiveness of an emissions control watercraft because the tugboat emissions negatively offset the emissions reduction function. Many tugboats do not have sufficient emissions controls themselves, thereby significantly reducing the net emissions reductions.

Disadvantage 4: Yet another disadvantage is that each of the tugboat trips described above requires an additional crew per tugboat. Typically there are at least two crew members per tugboat. The additional crew add cost, thereby reducing the cost-effectiveness of the emissions control watercraft.

Disadvantage 5: Yet another disadvantage is that each of the tugboat vessel trips described above requires additional fuel, which wastes energy and adds cost, thereby reducing the cost-effectiveness of the emissions control watercraft.

Disadvantage 6: Yet another disadvantage is that each of the tugboat vessel trips described above reduces the useful life of each tugboat, which adds cost, thereby reducing the cost-effectiveness of the emissions control watercraft function.

Disadvantage 7: Yet another disadvantage of using tugboats to move an emissions control watercraft is the danger of immobilizing the serviced watercraft. If an emergency occurs in which the emissions control watercraft needs to be removed because the emissions control watercraft is exposed to danger while secured next to the serviced watercraft, then an unscheduled tugboat request is initiated. Unfortunately, the tugboats may not be available on short notice. It may take many hours before at least one tugboat is available to disconnect the servicing watercraft from the serviced watercraft. Tugboats are typically scheduled in advance because they are busy working elsewhere in the harbor. Even if a tugboat could abandon its current work, the tugboat still must make the time-consuming journey across the harbor to the location of the servicing watercraft. During this waiting period, loss of life or equipment could occur.

Disadvantage 8: Yet another disadvantage of using tugboats to move an emissions control watercraft is the difficulty or impracticality in repositioning the emissions control watercraft relative to the serviced watercraft. Sometimes it is necessary to adjust the position of the emissions control watercraft. For example it may be necessary to a) move out of the way of potential falling containers during certain cargo loading/unloading modes, b) make room for another vessel passing nearby in a narrow channel, c) reposition due to changing conditions caused by water currents, d) reposition due to changing conditions caused by changing ballasting of the serviced vessel, and/or e) make room for another servicing vessel such as a bunker fueling barge. This inability to reorient during the serviced vessel call can cause dangerous situations or can prevent cargo from being serviced. It is very undesirable to make an unscheduled tugboat call due to the additional cost of such a call, and due to the amount of time it takes to obtain a tugboat.

Disadvantage 9: Yet another disadvantage of using tugboats to move an emissions control watercraft is that it precludes the efficient use of a hydraulic power if the emissions control watercraft is self-propelled with hydraulic thrusters. If hydraulic power is already necessary to supply hydraulic power to a hydraulic exhaust capture system, then supplying hydraulic power to the propulsion system during alternate modes of operation using the same source of hydraulic power reduces capital cost.

A second set of disadvantages (10-16) pertains to securing a servicing vessel alongside (in parallel to) the serviced vessel.

Disadvantage 10: In the case where a prior-art emissions control watercraft is moored using mooring lines alongside (parallel and side-by-side) a serviced watercraft and if the serviced watercraft is a cargo ship, then there is a danger that cargo may accidentally fall off the serviced watercraft and impact the emissions control watercraft that is operating below. This is a potential danger to the emissions control watercraft and personnel. Cargo can weigh more than 65,000 pounds and can fall a distance exceeding 75 feet. Falling cargo has been known to severely damage or even sink servicing watercraft operating alongside.

The superstructure of serviced watercraft typically contains crew's quarters, wheelhouse/bridge, fuel connections, oil connections, and exhaust pipes. On cargo ships, the cargo sections typically occupy the space immediately before and/or aft of the superstructure. If an emissions control watercraft is secured with mooring lines a mooring device alongside a serviced watercraft near the superstructure of a serviced watercraft, then any part of the emissions control watercraft that extends either before or aft of the superstructure of the serviced watercraft is in danger of being impacted by falling cargo such as shipping containers from above. Since the length of an emissions control watercraft is typically more than 100 feet, and the superstructure of the serviced watercraft (the aspect that does not hold cargo) is typically only about 50 feet long, a significant fraction of the serviced watercraft is typically exposed to the danger of falling cargo when the emissions control watercraft is moored alongside (in parallel) with the serviced watercraft.

When an emissions control watercraft is moored alongside using mooring lines, the unpowered seagoing barge (SGB) cannot be relocated when cargo is being handled directly above without a tugboat thereby exposing the emissions control watercraft to danger from falling cargo.

The prior-art has used a spacer, or a spacer barge, inserted between the servicing watercraft and a serviced vessel while coupling the two watercrafts together using mooring lines with the intention to place the servicing watercraft a distance away from the serviced watercraft, but this does not sufficiently reduce the danger of falling cargo. In the example where the serviced vessel is a container ship, and if a shipping container were to fall from the serviced watercraft, it would fall some distance away from the vessel, not vertically straight down. Thus, a spacer is only effective if the shipping container were to fall directly down the side of the serviced watercraft, which rarely happens. Therefore, a disadvantage of using a spacer which is typically only about 20 feet wide is that it does not appreciably reduce the danger of cargo falling onto the emissions control watercraft unless the spacer dimension is greater than about 20 feet. Even if the spacer dimension is sufficient to prevent the cargo from impacting the servicing vessel, it still impacts the spacer, which could likely still impart a significant impact to the emissions control watercraft thereby causing damage or injury.

Another disadvantage of using a spacer or spacer barge is that it requires that the spacer must be stored, moved, transported, and manipulated into position. A spacer has a disadvantage of increased cost from storage fees for the spacer when not in use. A further disadvantage is an additional cost incurred when a spacer requires more than one tugboat, thereby requiring additional tugboat trips, to position the spacer alongside an emissions control watercraft. A further disadvantage is an additional time required to move, transport, and position a spacer which increases costs and increases the amount of time it takes to connect to a serviced vessel.

Disadvantage 11: An emissions control watercraft usually needs to be placed adjacent to the superstructure (house) of a serviced watercraft because the superstructure of the serviced watercraft is typically directly above the engine room and associated exhaust pipes are located. On many vessels, the superstructure is near the stern (rear) of the vessel. This is true on non-containerships such as bulk carriers, tankers, Roll on/Roll off (RoRo's), and auto carriers. If a serviced watercraft is lightly loaded and therefore sits high in the water, the stern (the run) has a sharp rake (a rounded incline from perpendicular), and there is not a vertical flat area (sheer strakes) where the vessel can securely come alongside for coupling. In response to this situation, a large floating fender (a large inflated balloon-like bumper) has been used to fill the irregular gap between a servicing vessel and a non-vertical side of a serviced vessel. U.S. Pat. No. 3,063,400A by Yamaguchi Minoru and Kobayashi Takashi, dated Aug. 17 1960, and assigned to Yokohama Rubber Co Ltd, is an example of this approach. These floating fenders are typically referred to in the industry as "Yokohamas." However, a disadvantage of this common approach that it is inconvenient, complicated, time-consuming, and requires constant attention as vessel cargo is loaded and unloaded. Another disadvantage of this approach is that a serviced vessel may rise out of the water even further during the operation due to cargo unloading and reduction in ballast. The amount vertical flat area available may become critically limited, and the gap between the vessels may become excessively large, which may create an unsafe coupling situation. Thus, mooring an emissions control watercraft to a serviced watercraft can be difficult, or impossible, or dangerous.

Disadvantage 12: Frequently two servicing watercrafts need to operate on the same serviced vessel at the same time. One of several examples of this is when an emissions control watercraft is operating next to the superstructure of the serviced vessel, and then a bunker (fueling) barge also needs to be positioned next to the superstructure. Since both servicing vessels cannot be alongside with the serviced vessel in the same location at the same time, the emissions control watercraft is frequently forced to disconnect and move to another location where it is impossible to reach the exhaust pipes. When this happens, emissions control watercraft cannot perform its emissions reduction function. Also, the emissions control watercraft cannot reduce pollution during the time that the bunker barge is in use. Another disadvantage is that the emissions control watercraft is standing-by thereby wasting energy and workforce during the time that the bunkering barge is in use, which is not cost effective.

One anticipated solution to this problem is to position both servicing watercraft end-to-end so that both can possibly service the serviced watercraft concurrently. However, this is not possible when both servicing watercraft use the incumbent method of using mooring lines to couple to the serviced vessel. If both servicing vessels are placed end-to-end next to the serviced vessel, then the mooring lines of one servicing vessel would cross the mooring lines of the second servicing vessel. Crossing mooring lines cannot be done safely, thereby preventing both servicing vessels from operating concurrently.

Disadvantage 13: Servicing watercraft that are used for liquid bulk carriers (i.e., tanker vessels) that carry flammable liquids or flammable gases (e.g., petroleum products) have special requirements. As stated above, prior-art emissions control watercrafts also have specific disadvantages when they are used with oil (petroleum) tankers. A comprehensive assessment by the California Air Resources Board (see the SRIA accompanying this application, "Proposed Control Measure for Ocean-Going Vessels At Berth, Standardized Regulatory Impact Assessment (SRIA) released after the priority date of this application) concluded on page 76 that those skilled in the art (industry stakeholders) "do not anticipate using barge-based capture and control systems due to safety considerations that include hazards inherent in aligning a barge alongside a tanker". As stated above, the CARB staff concluded that "tanker vessels would use land-based capture and control systems [as opposed to barge-based systems] to control emissions from vessel visits . . . this assumption is based on extensive feedback and conversations with oil industry stakeholders".

Thus, the above referenced SRIA teaches away from a barge-based capture and control system but instead teach towards a land-based capture and control system. However, land-based capture and control systems have many disadvantages which are listed below.

Disadvantage 14: At-berth liquid bulk vessels that carry flammable cargo (i.e., oil (petroleum) tankers) contribute a large fraction of the pollution at most of the world's ports. Thus, there is a tremendous need to capture emissions from tankers. Nearly all the cargo pumps on petroleum tankers are powered by boilers instead of diesel power, electric power, or diesel-electric power. Thus, unlike other types of ocean-going vessels, petroleum tankers cannot use shore power. Also, petroleum tankers do not allow barges to be moored alongside with mooring lines while loading or off-loading cargo. Furthermore, tankers must be able to depart within 30 minutes in the case of an emergency. Tugs are usually not available at a moment's notice and therefore will likely not be available soon enough to meet the 30-minute requirement. However, the prior-art unpowered emissions control watercrafts cannot be used on tankers because 1) the unpowered barge that is moored to the tanker would prevent the tanker from departing until a tug arrives to pull the barge off the tanker, and 2) barges are not allowed to be moored to a tanker. Thus, to date, those skilled in the art have not been able to implement an emissions control watercraft that is compatible with tankers (see Disadvantage 14 above).

Disadvantage 15: At-berth petroleum tankers that carry flammable cargo cannot operate near equipment that could ignite explosive vapors. Unfortunately, all the existing prior barges use open flame heaters for raising the temperature of the exhaust gas or for vaporizing liquid fuel. Thus, prior-art emissions control watercraft that use flame heaters cannot be used to control emissions from petroleum tankers at berth.

Disadvantage 16: Furthermore, all the currently existing prior barges use equipment that can be an explosive hazard in many commonly used placements of the emissions control watercraft relative to the tanker during tanker cargo operations. All prior-art emissions control watercrafts do not conform to the National Fire Protection Association (NFPA) National Electric Code for Class I, Division 1 or 2 for hazardous locations. Thus, prior-art emissions control watercrafts cannot be used to control emissions from petroleum tankers at berth.

A third set of disadvantages (17-21) pertains to land-based capture and control systems.

Disadvantage 17: Land-based capture and control systems that are used in lieu of barge-based capture and control systems require extensive shoring up of wharves to support the weight per page 16 of the above referenced SRIA. This adds unnecessary expense and delays implementation by years.

Disadvantage 18: Land-based capture and control systems that are used in lieu of barge-based capture and control systems require infrastructure improvements, per page 16 of the above referenced SRIA. This adds unnecessary expense and delays implementation by years.

Disadvantage 19: Land-based capture and control systems that are used in lieu of barge-based capture and control systems require design, permitting, and installation systems in every berth, per page 18 of the above referenced SRIA. This adds unnecessary expense and delays implementation by years.

Disadvantage 20: Land-based capture and control systems that are used in lieu of barge-based capture and control systems require maintenance and repair in every berth, per page 18 of the above referenced SRIA. This adds unnecessary expense.

Disadvantage 21: Land-based capture and control systems that are used in lieu of barge-based capture and control systems require the infrastructure improvements, design, permitting, installation, maintenance, and repair multiplied by a plurality of berths. The plurality of berths could all be serviced by a single barge-based capture and control system if it not where for the aforementioned disadvantages.

A fourth set of disadvantages (22-23) pertains to greenhouse gas emissions produced by prior-art emissions control watercrafts.

Disadvantage 22: All prior-art emissions control watercrafts are electrically powered by gensets fueled by fossil fuel. Unfortunately, gensets fueled by fossil fuel emit air pollution in the form of particulate matter (PM), oxides of nitrogen (NOx), oxides of sulfur (SOx or $SO_2$) and greenhouse gas emissions in the form of carbon dioxide ($CO_2$). These emissions are counterproductive to the emissions reduction purpose of the emissions control watercraft and reduce the net efficiency of said emissions control watercraft.

Disadvantage 23: All prior-art emissions control watercrafts use fossil fuel in the form of propane, compressed natural gas (CNG), or liquified natural gas (LNG) to heat the process gas. Unfortunately, burning said fossil fuel causes air pollution in the form of particulate matter (PM), and oxides of nitrogen (NOx) and greenhouse gas emissions in the form of carbon dioxide ($CO_2$). Furthermore, CNG fuel systems can leak, releasing methane into the atmosphere. Furthermore, LNG can leak or boil off, releasing methane into the atmosphere. These emissions are counterproductive to the emissions reduction purpose of the emissions control watercraft and reduce the net efficiency of the emissions control watercraft.

A fifth set of disadvantages (24-25) pertains to tanker emissions.

Disadvantage 24: Emissions from tankers are predominantly from boilers. For this reason, tankers are a leading uncontrolled source of emissions. Prior-art emissions control watercrafts do not control emissions from boilers.

Disadvantage 25: Many modern petroleum tankers have inert gas (IG) systems that divert low-oxygen exhaust from the tanker's boiler or engine into the cargo tanks. Cargo tank vents can therefore release boiler and engine emissions as well as hydrocarbon vapors released from the cargo. Prior-art emissions control watercrafts only capture and control auxiliary engine emissions, not tanker cargo vent emissions.

Thus, in view of the many foregoing disadvantages, there has been a long-felt need for an improved emissions control watercraft for the reduction of emissions such as PM, NOx, SOx, and $CO_2$ from serviced watercraft. These disadvantages have significantly slowed widespread adoption of an emissions control watercraft approach. Based on the above SRIA evidence, those literally skilled in the art in the emissions control watercraft industry has not been able to solve these disadvantages despite the urgent need. Thus, a solution to overcome these disadvantages is not obvious.

SUMMARY

In accordance with at least one embodiment, an emissions control watercraft (STAXcraft) for servicing a serviced watercraft stationed at berth, said system comprising a floating platform: an anchoring system for fixing said floating platform at any predetermined orientation relative to said serviced watercraft without securing to said serviced vessel; an exhaust capture system for receiving emissions from said serviced watercraft; a purification system mounted to said floating platform, connected to said exhaust capture system for accepting and purifying said emissions from said exhaust capture system; said exhaust capture system comprising an arm and an exhaust pipe connector configured to connect to an exhaust pipe of the serviced watercraft whereby the STAXcraft may be placed any distance away from said serviced watercraft which allows the interconnection of said exhaust capture system to an exhaust pipe of said serviced watercraft for operation of the purification system to accept and purify said emissions.

FIGURES

The novel features which are characteristic of the present invention are set forth in the appended claims. However, embodiments, together with further objects and attendant advantages, will be best understood by reference to the following detailed description taken in connection with the accompanying drawings in which:

Figure 8:
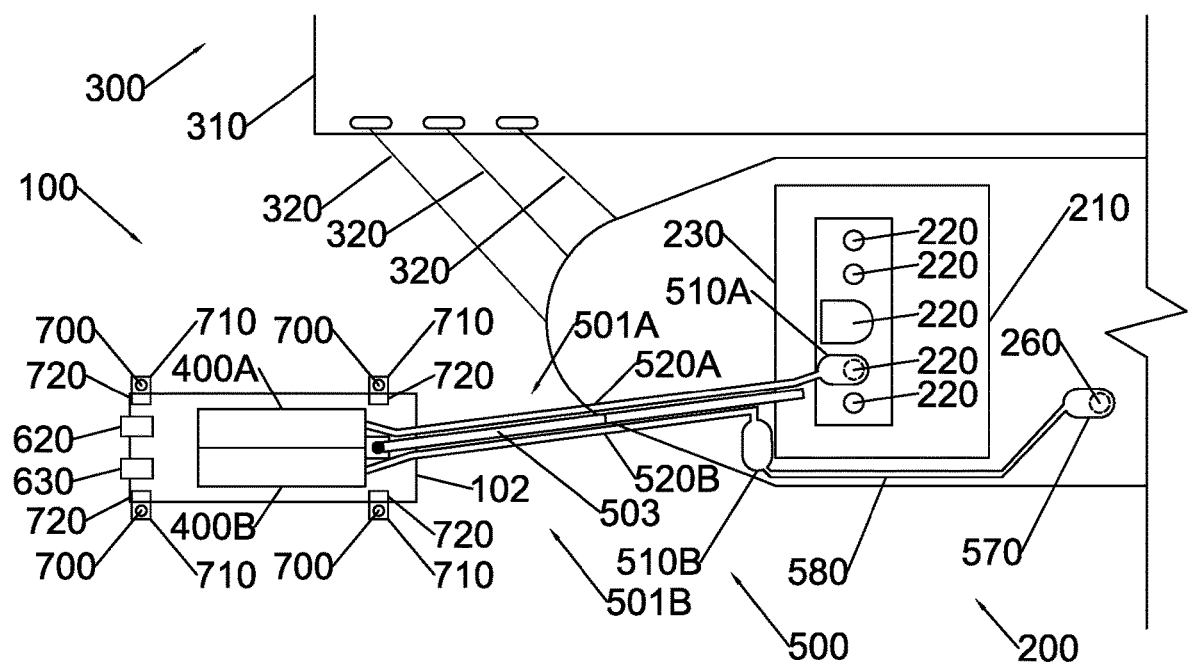

FIG. 8 shows an exemplary STAXcraft 100 connecting to both an exhaust pipe 220 on a funnel of serviced watercraft 200 and to a cargo tank vent 260.

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The details of one or more embodiments of the invention are set forth in the accompanying drawings and the description below. Other features, objects, and advantages of the invention will be apparent from the description and drawings, and from the claims.

Figure 1:
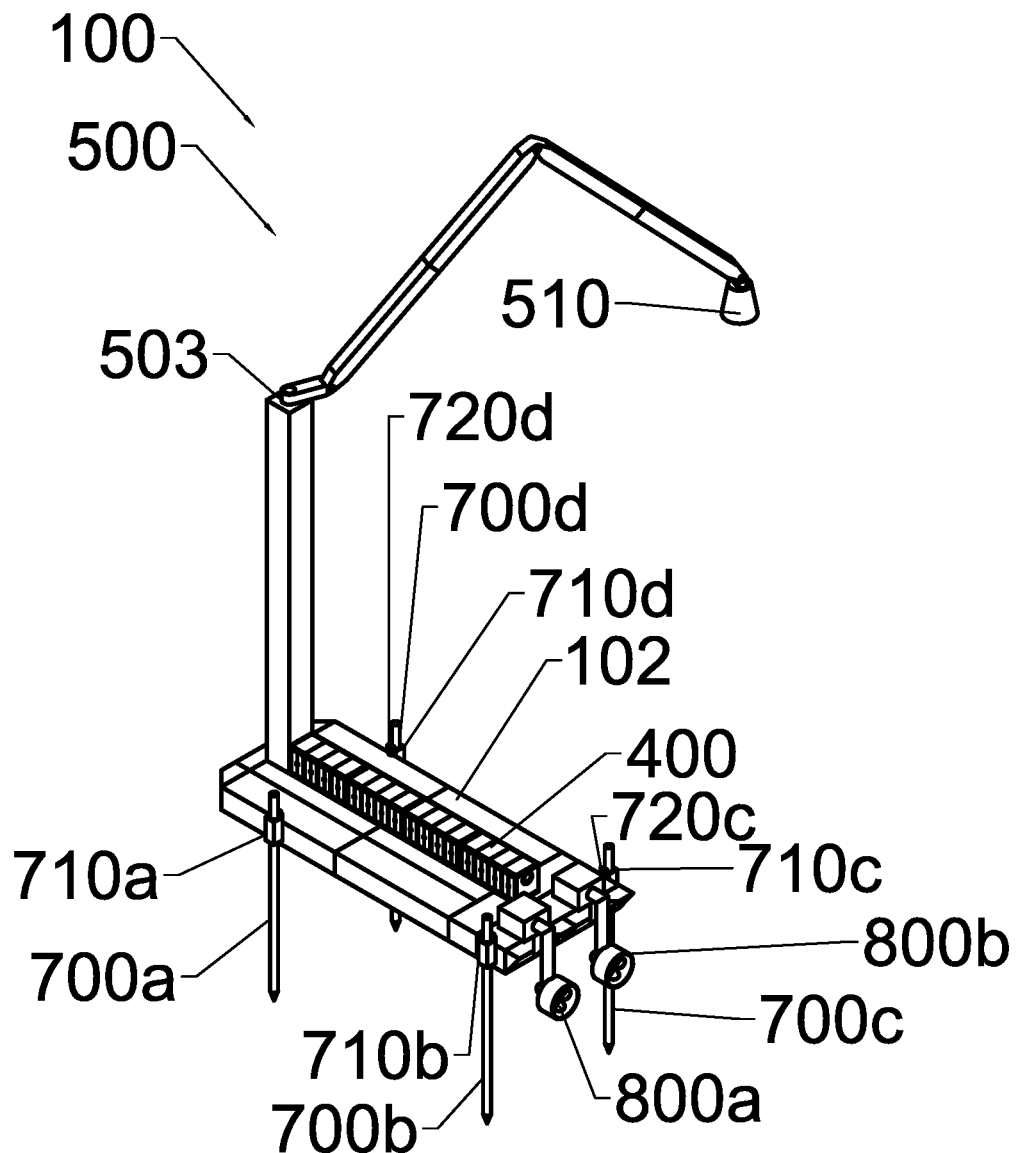
FIG. 1 shows an exemplary STAXcraft 100 with spuds deployed for an operational mode.

FIG. 1 shows one exemplary embodiment of an emissions control watercraft (STAXcraft 100) with a floating platform 102. This exemplary embodiment discloses an anchoring system comprising four spuds, although any number of spuds may be used depending on the specific application, each spud comprising spud column 700, spudwell 710, and spud drive 720. Spudwell 710 functions as a vertical guide sleeve for spud column 700. Spud column 700 may be raised or lowered by spud drive 720. Spud drive 720 may be electrically, mechanically, or hydraulically driven winch and line system, for example. The selection of spud size depends on the depth of water where the floating platform will be used. Any suitable anchoring system may be used as an alternative to the spud example shown. STAXcraft 100 further comprises an exhaust capture system 500 which contains ducting for conveying exhaust gas from serviced vessel 200. The ducting is supported by exhaust capture arm 503. Exhaust capture system 500 fluidly connects to at least one exhaust pipe connector 510. Exhaust capture system 500 may be electrically, mechanically, or hydraulically actuated. STAXcraft 100 further comprises a purification system 400. Purification system 400 is connected to receive exhaust gas from at least one exhaust pipe connector 510 by means of exhaust capture system 500. Thrusters 800a and 800b are pivotable for directing thrust in any direction to move the watercraft 100 through the water or position the watercraft in relation to a serviced watercraft. The thrusters may be mechanically, electrically, or hydraulically powered. FIG. 1 shows the example where all four spuds deployed downward to the seafloor thereby anchoring STAXcraft 100 in a position relative to a serviced watercraft, such as a serviced watercraft 200 shown in FIG. 4.

Figure 2:
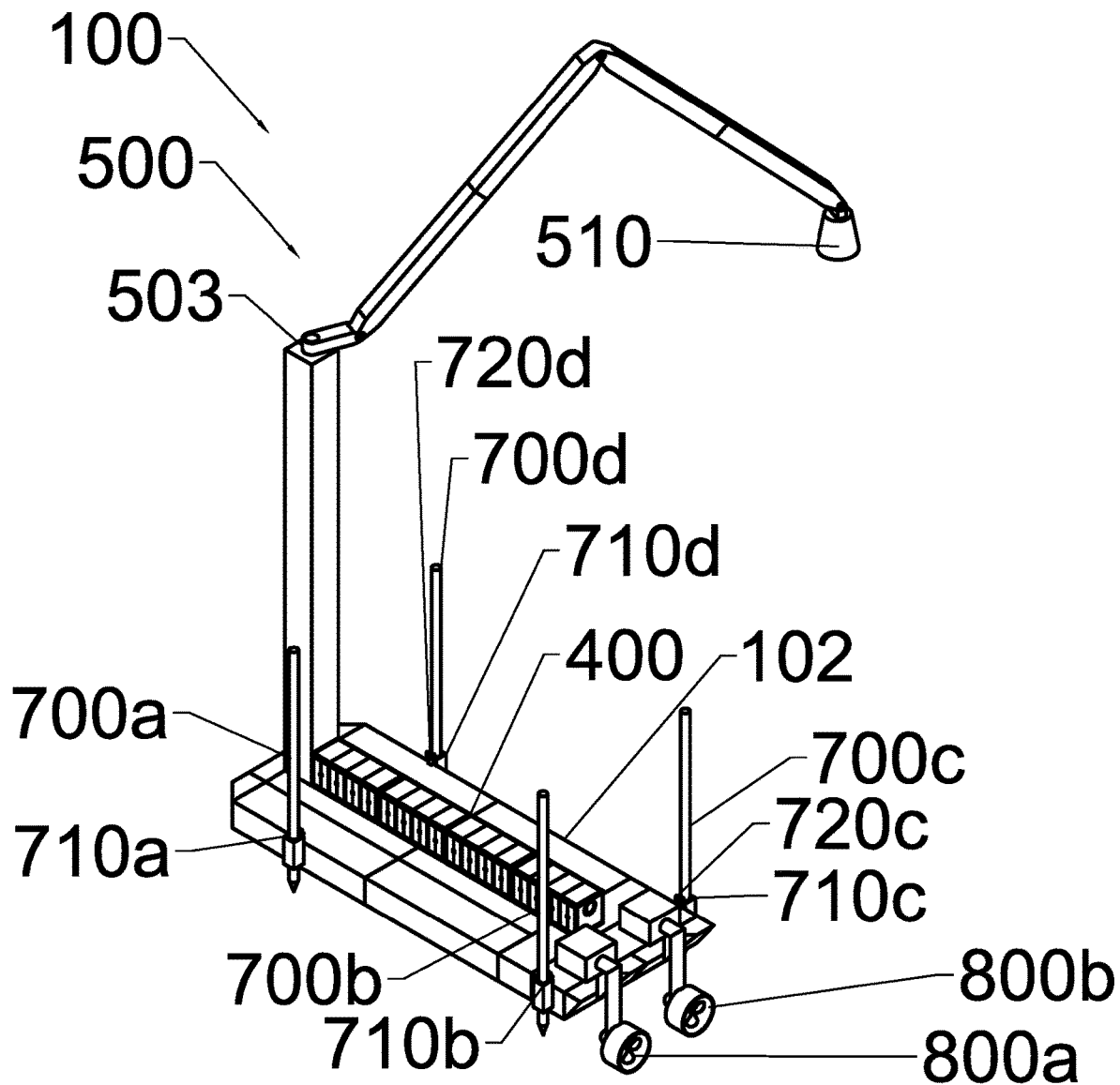
FIG. 2 shows an exemplary STAXcraft 100 with spuds stowed for a transportation mode.

FIG. 2 is the same as FIG. 1 except spuds 700 are stowed in the "up" position for travelling across water.

Figure 3:
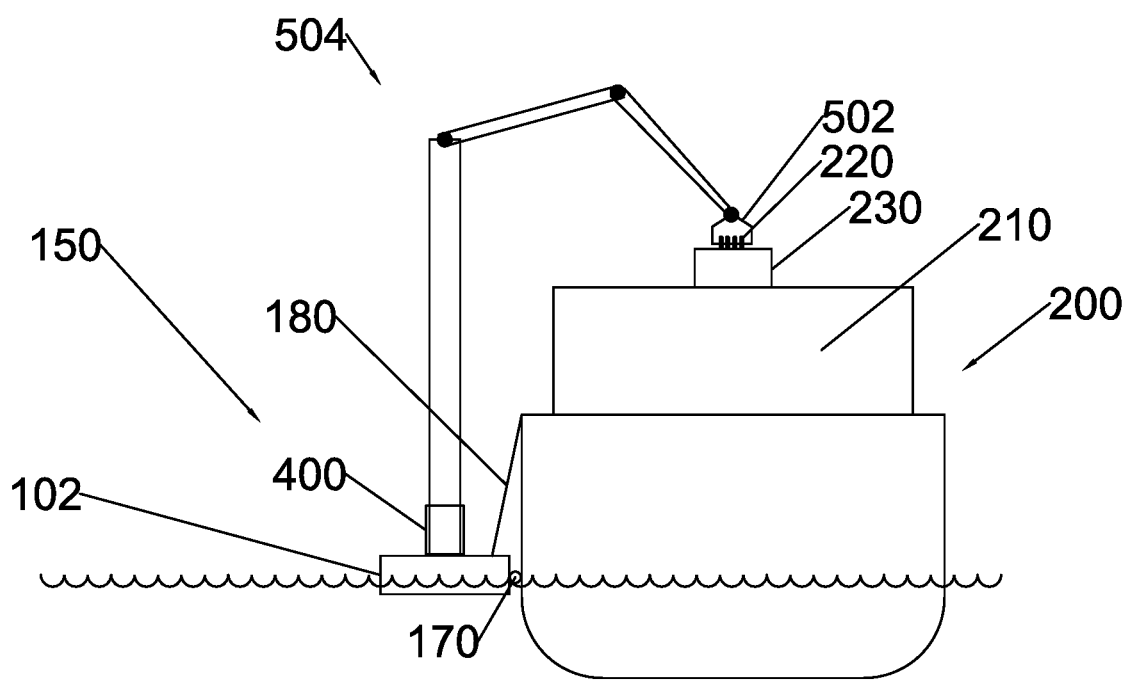
FIG. 3 shows prior-art servicing watercraft 150 positioned next to a serviced watercraft 200.

FIG. 3 shows a prior-art servicing watercraft 150 positioned alongside (adjacent to and parallel to) serviced vessel 200 and separated by fender/spacer/spacer barge 170. Prior-art servicing watercraft 150 is shown moored to (coupled to) serviced vessel 200 with at least one mooring line 180. Note that prior-art servicing watercraft 150 makes contact with serviced vessel 200 via fender/spacer/spacer barge 170. Prior-art servicing watercraft 150 may be moored to serviced vessel 200 by an alternative prior-art mooring device such as a stabilizing arm. Superstructure 210, funnel 230, and exhaust pipes 220 are mounted on serviced vessel 200. FIG. 3 further illustrates a prior-art exhaust capture system 504 and a prior-art bonnet 502 for capturing exhaust collectively from all the exhaust pipes located at the top of funnel 230 for conveying the exhaust gas to purification system 400. A floating platform 102 of prior-art servicing watercraft 150 and serviced watercraft 200 are traditionally separated by fender/spacer/spacer barge 170. Mooring lines 180 urge prior-art servicing watercraft 150 and serviced vessel 200 together but they are kept separated by a distance determined by the width of fender/spacer/spacer barge 170.

Figure 4:
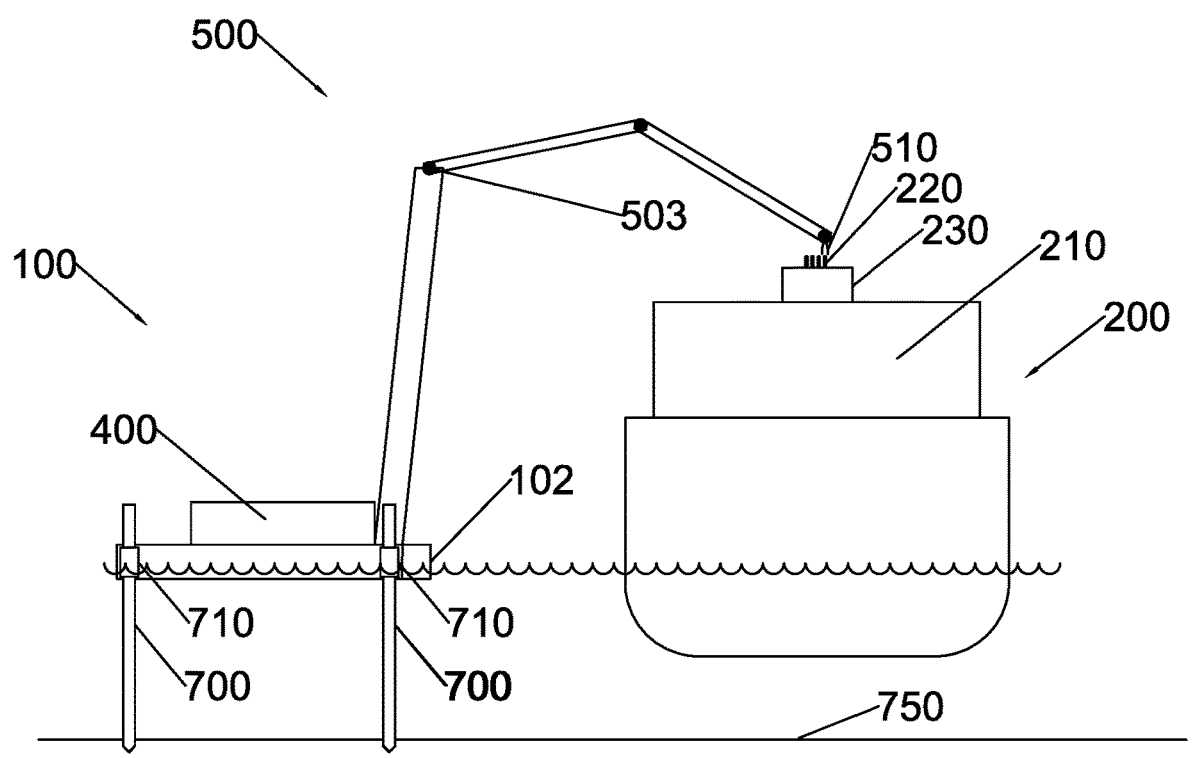
FIG. 4 shows an exemplary STAXcraft 100 positioned a distance away from a serviced watercraft 200.

FIG. 4 shows one exemplary embodiment of STAXcraft 100 positioned a predetermined distance from serviced vessel 200. The exemplary embodiment of FIG. 4 also shows STAXcraft 100 oriented perpendicular to serviced vessel 200, although any desired orientation between parallel and perpendicular may be selected. Serviced vessel 200 may be an oceangoing vessel (OGV), vessel, or ship. Superstructure 210, funnel 230, and a plurality of exhaust pipes 220 are mounted on serviced vessel 200. STAXcraft 100 comprises floating platform 102, purification system 400, exhaust capture system 500, exhaust capture arm 503, and at least one exhaust pipe connector 510. Each exhaust pipe connector 510 connects to a single exhaust pipe 220. Exhaust capture system 500 includes ducting for conveying exhaust gas from at least one exhaust pipe connector 510 through exhaust capture system 500 to purification system 400. STAXcraft 100 is shown anchored at a preselected distance from serviced watercraft 200 but the preselected distance concurrently permits exhaust capture system 500 and exhaust pipe connector 510 to connect to a preselected exhaust pipe 220.

Figure 5:
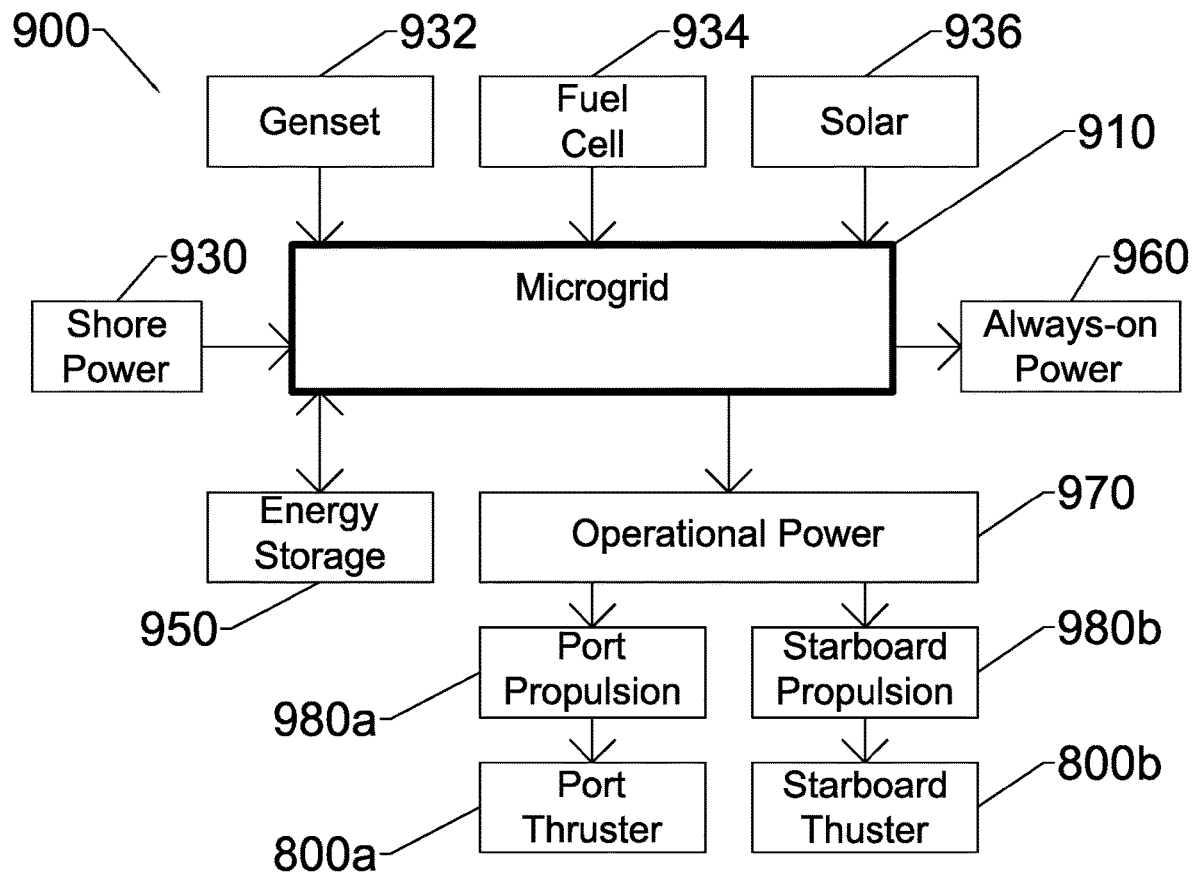
FIG. 5 shows an exemplary power system for a STAXcraft 100.

FIG. 5 shows one exemplary embodiment of a power system 900 of STAXcraft 100. Power system 900 comprises a microgrid 910, such as one provided by ABB for example, for receiving electrical power from various sources including, any combination of but not limited to, a shore power system 930, an electrical generator genset 932, a fuel cell power system 934, and a solar power system 936. Microgrid 910 further comprises energy storage system 950 for storing electrical energy and for supplying reserve electrical energy. Energy storage system 950 may be a battery, for example microgrid 910 supplies power to always-on power systems 960 that are intended to remain energized when devices that derive electrical power from operational power systems 970 are switched off. Operational power system 970 supplies power to, for example, port propulsion 980a which supplies power to port thruster 800a and starboard propulsion 980b which supplies power to starboard thruster 800b.

Figure 6:
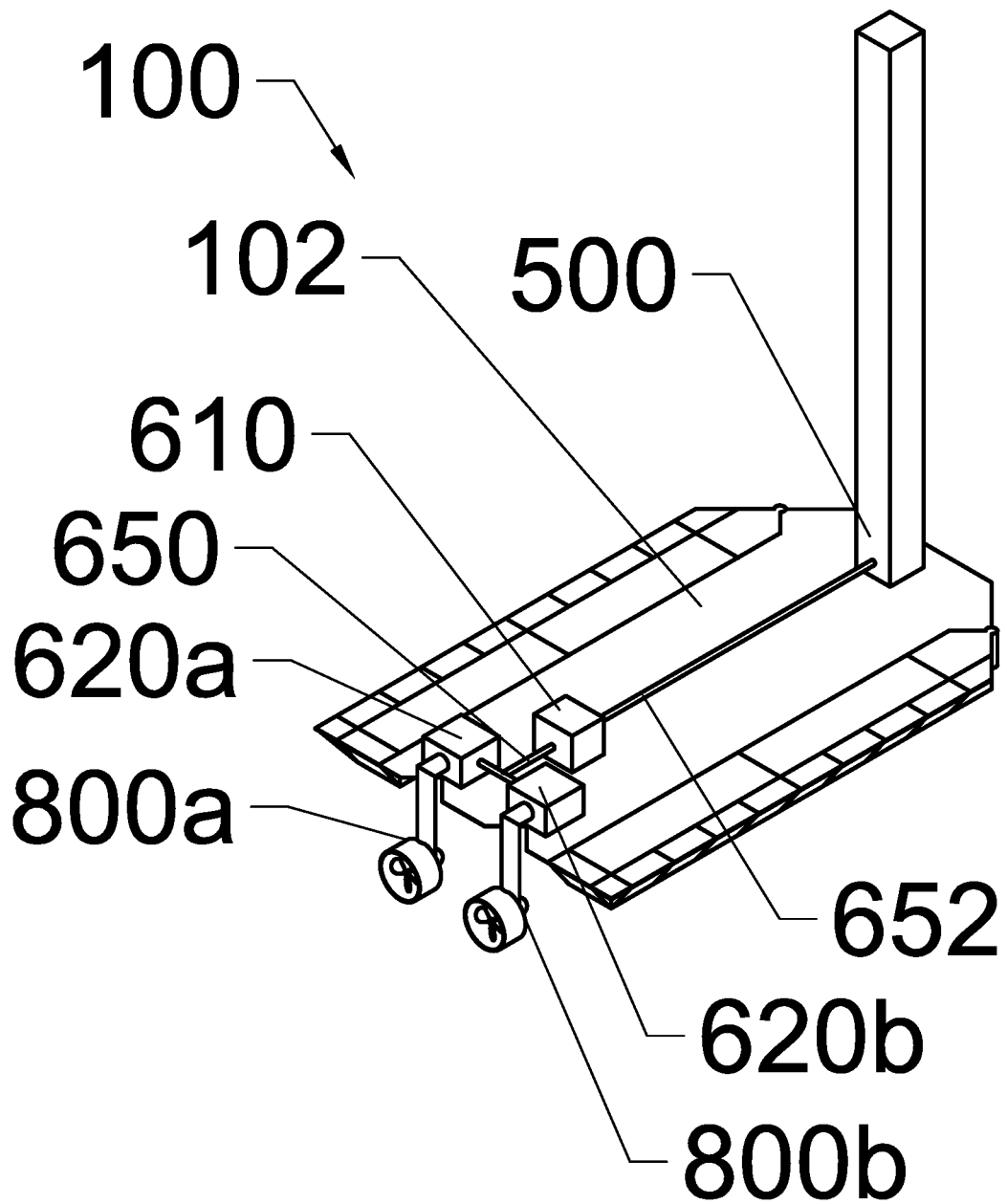
FIG. 6 shows an exemplary selective hydraulic system detail for a self-propelled STAXcraft 100.

FIG. 6 shows one exemplary embodiment of a self-propelled STAXcraft 100 comprising a floating platform 102, exhaust capture system 500, a hydraulic power unit 610, a plurality of hydraulic propulsion units 620, and a plurality of thrusters 800. In this exemplary embodiment, exhaust capture system 500 comprises a hydraulic arm. The output of at least one hydraulic power unit 610 connects to at least one hydraulic propulsion unit 620. In this exemplary embodiment, there are two hydraulic propulsion units: a port hydraulic propulsion unit 620a, and a starboard hydraulic propulsion unit 620b. The same hydraulic power unit 610 may also connected to exhaust capture system 500. There are two exclusive modes of hydraulic operation 1) propulsion and emissions capture system operation. In one exemplary embodiment, the hydraulic power output of hydraulic power unit 610 may be selected to connect to propulsion units 620 or exhaust capture system 500, depending on the mode of operation. In this exemplary embodiment floating platform 102 is a barge. Barges work well for this purpose because they typically do not have to travel far, and stay within the harbor, or inside the breakwater, and do not need to travel in the open ocean and do not have to be seagoing. Barges are also wider than other types of watercraft, thereby providing more roll stability, which is important for an emissions control servicing watercraft considering the destabilizing reach of an exhaust capture system for connecting to a serviced watercraft, thereby reducing relative motion. Other types of vessels are anticipated, such as hulled vessels and semi-submersible watercraft. Semi-submersible watercraft have the advantage of stability and compactness.

Alternative propulsion units include electric motor-driven propulsion units, battery electric drives, diesel-electric systems, or hydrocarbon-fueled engine-driven thrusters. In the case of an emissions control servicing watercraft, hydraulically driven propulsion is preferred because one or more hydraulic power unit(s) can be shared between the thruster(s) 800 and the capture system tower and arm 500 and an anchoring system. Hydraulic propulsion units, also called hydraulic thrusters or azimuth thrusters may be obtained from ABB, Thrustmaster, and Hydraulic Marine Systems, among others. For barges, these thrusters are typically outboard systems, although "built-in" thrusters or "pod" or "azipod" thrusters may also be implemented.

Typically, at least two thrusters 800 are required for barge operations. Four thrusters 800 (one on each corner) is preferred in some scenarios. Hydraulic outboard propulsion units typically include the ability to rotate the direction of thrust 360 degrees.

Hydraulic thrusters 800 are commonly driven by diesel engines, with one diesel engine per thruster. For this exemplary embodiment, however, at least one hydraulic power unit(s) 610 may be connected to at least one set comprising hydraulic propulsion system 650 and thruster 800 as well as to the capture system tower and arm 500. Multiple hydraulic power units 610 would provide redundancy, as an option. Each hydraulic power unit 610 may also be powered using an electric motor. Alternatively, an internal combustion engine could power each hydraulic power unit 610.

The exhaust capture system 500 of an emissions treatment system typically uses hydraulic power to pivot the arm about the vertical axis and to power the articulation of each joint in the arm. When a shared hydraulic power unit is used, care must be taken that the hydraulic power unit 610 can supply a predetermined pressure and flow of hydraulic fluid that is compatible with all propulsion systems 980 simultaneously or the capture system tower and arm 500 or the anchoring system shown in FIG. 1 and FIG. 2, whichever is largest.

Figure 7:
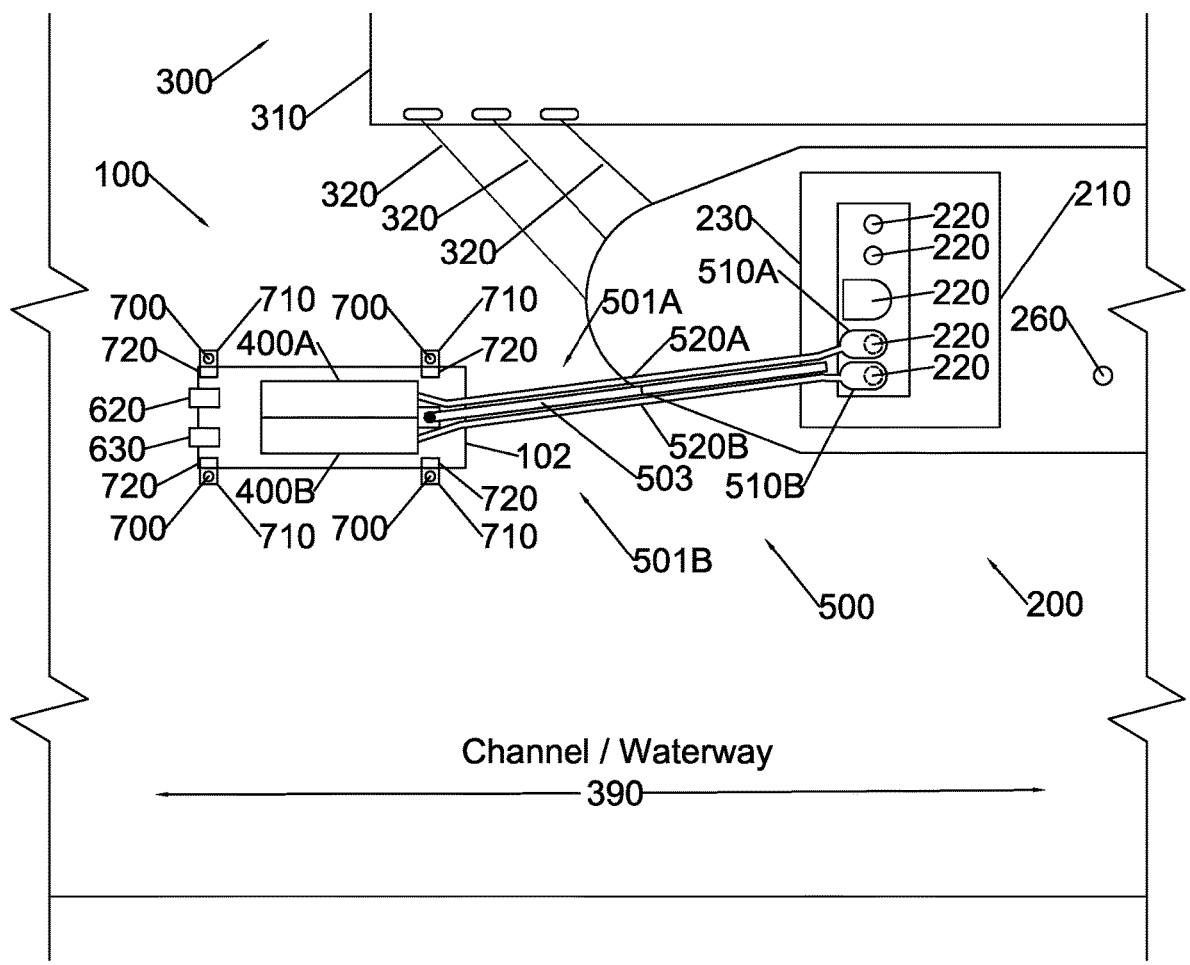
FIG. 7 shows an exemplary STAXcraft 100 positioned a distance away from a serviced watercraft 200.

FIG. 7 shows an exemplary embodiment of STAXcraft 100 positioned a predetermined distance from serviced vessel 200. Serviced vessel 200 is shown moored with mooring lines 320 to wharf 310 of terminal 300. STAXcraft 100 is oriented behind and inline serviced vessel 200, although any desired orientation between parallel and perpendicular may be selected. FIG. 7 shows STAXcraft 100 positioned and anchored away from mooring lines 320 while also not extending excessively outside the width of vessel 200, thereby allowing other vessels to pass by, especially in a narrow channel/waterway 390. Serviced vessel 200 may be an oceangoing vessel (OGV), vessel, or ship. Superstructure 210, funnel 230, and a plurality of exhaust pipes 220 are mounted on serviced vessel 200. In this exemplary embodiment, STAXcraft 100 comprises floating platform 102, two emissions processing circuits 501, and an exhaust capture arm 503. Each emissions processing circuit 501 comprises a purification system 400, emissions duct 520, and exhaust pipe connector 510. The exemplary embodiment shown in FIG. 7. shows a first emissions processing circuit 501A comprised of exhaust pipe connector 510A, emissions duct 520A, and purification unit 400A. A second emissions processing circuit 501B is shown comprised of exhaust pipe connector 510B, emissions duct 520B, and purification unit 400B. Each emissions processing circuit 501 services a preselected exhaust pipe 220. Note, any exemplary STAXcraft 100 may be configured for at least one emissions processing circuit 501 to up to four emissions processing circuits 501, or more. Exhaust capture system 500 comprises emissions ducts 520A and 520B and exhaust pipe connectors 510A and 510B. Each emissions duct 520 is fluidly connected to an emissions connector 510 for receiving emissions from an emissions source 220. Emissions source exhaust pipe 220 may be an engine exhaust pipe, a boiler exhaust pipe, or a cargo tank vent. In the case where emissions source exhaust pipe 220 is for a cargo tank vent, then the emissions may be from an inert gas (IG) system, hydrocarbon emissions from the cargo in the tank, or a combination of IG and hydrocarbon emissions. The emissions from the IG system may be from an engine, a boiler, or an inert gas supply. Each exhaust pipe connector 510 connects to a single emissions source exhaust pipe 220. In this exemplary embodiment, STAXcraft 100 is shown anchored with spuds 700 at a preselected distance from serviced watercraft 200 and the preselected distance still permits exhaust capture system 500 to connect to a preselected exhaust pipe 220.

In another exemplary embodiment, exhaust capture system 500 may be mounted on a floating platform, a barge, a watercraft, a vessel, a wharf, a pier, a dock, a jetty, a slab, or a land-based foundation. In another exemplary embodiment, each purification system 400 may be installed on a floating platform, a barge, a watercraft, a vessel, a wharf, a pier, a dock, a jetty, a slab, or a remote land-based foundation.

Hydrocarbon gas normally encountered in petroleum tankers cannot burn in an atmosphere containing less than approximately 11% oxygen by volume. Accordingly, one way to provide protection against fire or explosion in the vaper space of cargo tanks is to keep the oxygen level below that figure. This is usually achieved by using a piping arrangement to blow inert gas into each cargo tank to reduce the air content, and hence the oxygen content, and render the tank atmosphere non-flammable. The source of inert gas (IG) may be selectively diverted from the engines or boilers of serviced vessel 200. Thus, emissions that would otherwise exit via an exhaust pipe 220 may be diverted by an IG system through a cargo tank to a location that is not located near the other exhaust pipes 220 on funnel 230, but instead on the deck of the tanker, usually near the cargo tank that is being vented. The emissions from a vent 260 may be selected from the group consisting of hydrocarbon vapors, engine emissions, and boiler emissions. There may be more than one vent 260, typically one per cargo tank. It is desired to capture and purify the vent 260 emissions in addition to engine and boiler emissions from the exhaust pipes 220 on funnel 230.

FIG. 8 shows an exemplary embodiment of STAXcraft 100 positioned a predetermined distance from serviced vessel 200. Serviced vessel 200 is shown moored with mooring lines 320 to wharf 310 of terminal 300. STAXcraft 100 is shown oriented behind and inline serviced vessel 200, although any desired orientation between parallel and perpendicular may be selected. Serviced vessel 200 may be an oceangoing vessel (OGV), vessel, tanker, or ship. Superstructure 210, funnel 230, and a plurality of exhaust pipes 220 are mounted on serviced vessel 200. In this exemplary embodiment, STAXcraft 100 comprises floating platform 102, two emissions processing circuits 501, and an exhaust capture arm 503. Each emissions processing circuit 501 comprises a purification system 400, emissions duct 520, and exhaust pipe connector 510.

The exemplary embodiment shown in FIG. 8. shows a first emissions processing circuit 501A comprised of exhaust pipe connector 510A, emissions duct 520A, and purification unit 400A. FIG. 8 further shows at least one vent 260 for venting a gas from a cargo tank on serviced vessel 200. In this example, vent 260 not located on funnel 230, but on the deck of the tanker. Vent 260 may be a high velocity vent installed at a typical minimum height of 2 m above the deck, or a vent riser with a typical minimum height of 6 m above the deck, or simply a hatch for a cargo tank on serviced vessel 200. In this example, emissions processing circuit 501B is instead applied to a vent 260. Vent emissions duct 580 extends the reach of emissions processing circuit 501B for connection to a vent connector 570. Vent emissions duct 580 may be a selected from commercially available flex duct of a predetermined length to reach from any of the tank vents 570 to the interface to the 510B connector. Vent connector 570 is sized for placement over vent 260 for capturing vent emissions. Vent emissions duct 580 may either connect directly to emissions duct 520 or to exhaust pipe connector 510 via an adapter.

Note: A corresponding number of emissions processing circuits 501 may be used for any expected combination of exhaust pipes 220 and vents 260.

REFERENCE NUMERALS

100 STAXcraft (emissions control watercraft)
102 Floating Platform
150 Prior-art Servicing Watercraft/Emissions control watercraft
170 Fender/spacer/spacer barge
180 Mooring Line
200 Serviced watercraft, Vessel, or Oceangoing Vessel (OGV)
210 Superstructure/House/Accommodation Block
220 Emissions Source Exhaust Pipe
230 Funnel
250 Bunker Barge/Another servicing watercraft
260 Vent
300 Terminal
310 Wharf
320 Mooring Line
390 Channel/Waterway
400 Purification System/Emissions Processing Unit
500 Exhaust Capture System
501 Emissions Processing Circuit
502 Bonnet
503 Exhaust Capture Arm
504 Prior-art Exhaust Capture System
510 Exhaust Pipe Connector
520 Emissions Duct 570 Vent Connector
580 Vent Emissions Duct
610 Hydraulic Power Unit
620 Port Propulsion Unit
630 Starboard Propulsion Unit
650 Hydraulic Piping, Hydraulic Propulsion System
652 Hydraulic Piping, Exhaust Capture System
700 Spud Column
710 Spudwell
720 Spud Drive
750 Seafloor
800 Thruster
900 Power System
910 Microgrid
930 Shore Power System
932 Electrical Generator/Genset
934 Fuel Cell
936 Solar
950 Energy Storage System
960 Always-on Power System
970 Operational Power System
980 Propulsion Power System

OPERATION

Diesel engines produce electrical power for vessels. These diesel engines produce diesel exhaust, which contains particulate matter, oxides of nitrogen, and sulfur dioxide, which cause harm to human health and the environment. After a vessel travels into a port and moors to a wharf it turns the main engine off. However, at least one large diesel engine continues to generate electrical power for the vessel even during the at-berth mode. Unfortunately, each auxiliary engine produces a similar amount of exhaust as tens of thousands of automobiles, and these emissions continue to be emitted from the vessel until the vessel departs from the port. FIG. 4 shows an example vessel 200 that contains diesel engines in an engine room which is located under and within superstructure 210. Each diesel engine has an exhaust pipe 220 that conveys exhaust from the diesel engine to the top of funnel 230 to atmosphere outside of vessel 200. All exhaust pipes exit the vessel at the deck that is located near the top of funnel 230, with one exhaust pipe per engine. Thus, each operating diesel engine creates emissions that escape into the atmosphere through its associated exhaust pipe 220 located on top of funnel 230 unless the pollution is captured and purified by a STAXcraft 100.

The following describes the operation of several exemplary embodiments of an emissions control watercraft (STAXcraft 100) that has solved the disadvantages listed herein.

FIG. 2 shows STAXcraft 100 with an anchoring system comprising spud columns 700, whereas the spud columns 700 are raised thereby allowing transport of STAXcraft 100 across the top of a body of water. STAXcraft 100 is self-propelled using a plurality of thrusters 800 and thus does not require tugboats to transport it or to position it near serviced watercraft 200. When a serviced vessel 200, such as an oceangoing vessel (OGV) for example, comes to berth and is moored onto a wharf 310 at terminal 300 (see FIG. 7), then STAXcraft 100 moves under its own power using thrusters 800 to a predetermined location, as shown in FIG. 4 for example, within reach of the exhaust pipes 220 of serviced watercraft 200, but with a predetermined space between STAXcraft 100 and serviced watercraft 200. While the anchoring system or spuds 700 are still retracted upwards, STAXcraft 100 moves under its own power with thrusters 800 to a location where if cargo were to fall from serviced watercraft 200, the cargo would miss STAXcraft 100 and splash into the water in a location where a prior-art servicing watercraft would likely have been. Furthermore, if bunker operations are planned during the vessel call, then STAXcraft 100 may be placed at a sufficient distance away from serviced watercraft 200 or offset to one side such that another servicing watercraft such as a bunker (fueling) barge may fit between STAXcraft 100 and serviced watercraft 200, thereby allowing both servicing operations to take place concurrently. Alternatively, STAXcraft 100 may be positioned sufficiently fore or aft along the side of serviced watercraft 200, so that both STAXcraft 100 and a bunker barge can service serviced watercraft 200 concurrently. Cargo operations may be temporarily halted in the OGV section above STAXcraft 100 during the interval when STAXcraft 100 is temporarily positioned to allow the other servicing watercraft 250 to share the same general location next to serviced watercraft 200. Once STAXcraft 100 is positioned at a predetermined location, then the anchoring system is activated, which in this example embodiment, is accomplished by the lowering of spuds 700 downward to the seafloor, thereby fixing STAXcraft 100 in the predetermined location.

Alternatively, if the serviced watercraft 200 is a tanker, then STAXcraft 100 is preferably be positioned aft of the watercraft 200 (see FIGS. 7 and 8) in a location that still allows exhaust capture system 500 to reach exhaust pipes 220 and also avoids any OGV-to-wharf mooring lines 320 and also places a maximized distance between STAXcraft 100 and serviced watercraft 200. The maximized distance provides additional safety by avoiding heavier-than-air explosive vapors that would otherwise flow down to a prior-art watercraft that would be secured alongside a tanker. Furthermore, a location aft of the tanker superstructure (house) is considered safe of explosive hazards, while the location alongside a tanker is considered dangerous due to explosive hazards. Once STAXcraft 100 is in the preferred location, then the anchoring system is activated, spuds 700 are deployed downward to the seafloor, which fixes STAXcraft 100 in a predetermined location relative to tanker 200. The placement of STAXcraft 100 relative to tanker 200 is considered safe, as opposed to the former method of securing a prior-art servicing watercraft alongside tanker 200 which is considered unsafe.

This exemplary embodiment discloses an anchoring system comprising four spuds, although any number of spuds could be used, although only a minimum two spuds are required, each spud comprising spud column 700, spudwell 710, and spud drive 720. Spudwell 710 functions as a vertical guide sleeve for spud column 700. Spud column 700 may be raised or lowered by spud drive 720. Spud drive 720 may be either an electrical, mechanical, or hydraulic winch and line system, for example. In this exemplary embodiment, a steel cable that is attached to the foot of spud column 700 and is retracted by a hydraulic winch such that the spud column is lifted through spudwell 710 thereby allowing STAXcraft 100 to travel along the water.

Once STAXcraft 100 is in the predetermined location, then, in one exemplary embodiment, the spud columns 700 are lowered to the seabed (see FIG. 4) thereby anchoring STAXcraft 100 and fixing the location of STAXcraft 100 at the predetermined location. Lowering a spud column 700 is accomplished by releasing any brakes and causing the direction of the winch to pay out the steel cable which attached to the foot of spud column 700. Gravity pulls spud column 700 to the extent that the winch leases a length of steel cable, for example.

Once STAXcraft 100 is anchored in the predetermined location, then as shown in an exemplary embodiment in FIG. 4, exhaust capture system 500 is manipulated to bring exhaust pipe connector 510 to a selected exhaust pipe 220. After connecting to the selected exhaust pipe 220 of serviced watercraft 200, then exhaust is drawn through exhaust capture system 500 and then through purification system 400, thereby purifying the exhaust gas emissions prior to release to the atmosphere.

Referring to FIG. 5, operational power system 970 is activated during an operational mode, including for example, but not limited to, when warming-up purification system 400, testing STAXcraft 100, connecting to a serviced vessel 200 for purifying emissions, or cooling-down purification system 400. An exemplary use of always-on power system 960 is for when STAXcraft 100 is in a non-operational mode in which STAXcraft 100 is, for example, not propelling itself, not connecting to or disconnecting from serviced vessel 200, not operating an anchoring system, or not operating purification system 400. Another exemplary use of always-on power system 960 is for when STAXcraft 100 is between operations and is idle (between operations) at a home berth. During the non-operational mode, microgrid 910 may be powered, for example, by a shore power system 930 or a solar power system 936. Also, during the non-operational mode, for example, microgrid 910 may power always-on power system 960 for powering instruments that are predetermined to remain operational such as lights, communications, instruments, and supervisory control systems. Also, during a non-operational mode, energy storage system 950 may be re-charged. Alternatively, always-on power system 960 may be switched off during infrequent any predetermined events, including but not limited to, service, maintenance, and extended downtime.

In one exemplary embodiment, as shown in FIG. 6, STAXcraft 100 includes at least one propulsion system 980 that is supplied hydraulic power from a single hydraulic power unit 610, whereas each propulsion system 980 supplies hydraulic power to a connected thruster 800. Alternatively, each hydraulic power unit 610 for may be dedicated to a particular hydraulic propulsion unit 980. Another alternative configuration is to have more than one hydraulic power units 610 for redundancy, but each hydraulic power unit 610 can be directed to any hydraulic propulsion unit. A propulsion system 980 may alternatively be powered by diesel engine(s), or diesel-electric engine(s), or electric motor(s).

An exemplary embodiment shown in FIG. 6 illustrates hydraulic power unit 610 powering exhaust capture system 500 via hydraulic piping 652, and alternately powering at least one hydraulic propulsion system 620 via hydraulic piping 650. A STAXcraft 100 may have two modes of operation which are exclusive of each other. A first mode is for self-propulsion of STAXcraft 100. A second mode is for operating the manipulation of exhaust capture system 500. Once STAXcraft 100 is positioned at a predetermined distance from serviced vessel 200, the anchoring system may be enabled and the propulsion system may be turned off, thereby freeing hydraulic power unit 610 to provide hydraulic power to exhaust capture system 500 for connecting and disconnecting to serviced vessel 200. Once exhaust capture system 500 is disconnected and stowed, then hydraulic power from hydraulic power unit 610 may be again redirected to at least one propulsion unit 620. Thus, a single hydraulic power unit 610 may supply hydraulic power for both a propulsion system 620 of STAXcraft 100 and for selectively powering a manipulation of exhaust capture system 500, thereby reducing the number of hydraulic power units 610 required thereby reducing the capital cost and the complexity of STAXcraft 100.

Referring to FIG. 7, in one exemplary embodiment, after a serviced watercraft 200 is moored at terminal 300 alongside wharf 310 with mooring lines 320. STAXcraft 100 is positioned using propulsion units 620 and thrusters 800 so the distance between STAXcraft 100 and serviced watercraft 200 is maximized while still allowing exhaust capture system 500 to reach selected exhaust pipes 220 while also avoiding any OGV-to-wharf mooring lines 320. Note that the exemplary position of STAXcraft 100 shown allows other OGV's to pass though a channel/waterway 390, whereas if a prior-art servicing watercraft were located alongside the serviced vessel 200, other OGV's would not be able to pass safely, as documented in the SRIA. Also note that as OGV's have become larger and wider over time and the width of existing channels/waterways 390 are fixed, this is becoming more of a problem. This problem is solved by the present application. If serviced watercraft 200 is a tanker, for example, the maximized distance provides additional safety by avoiding heavier-than-air explosive vapors that would otherwise flow down to a deck of a prior-art servicing watercraft that would be secured alongside a tanker. Furthermore, a location aft of a tanker superstructure/accommodation block/house is considered safe of explosive hazards. Once STAXcraft 100 has been positioned in a preferred location, then an anchoring system is activated. In this exemplary embodiment, the anchoring system comprises spuds 700 which are deployed downward through spudwells 710 using spud drives 720, where the pointed ends of at least two spuds 700 are embedded in the seafloor, which fixes STAXcraft 100 in a predetermined location relative to a serviced watercraft 200. Once anchored, in an exemplary embodiment, hydraulic power from hydraulic power unit 610 to propulsion units 620 (if hydraulic propulsion is used) is deselected and hydraulic power to emissions capture system 500 is selected. Exhaust capture system 500 is manipulated to connect at least one exhaust pipe connector 510 to at least one exhaust pipe 220 and activating the associated emissions processing circuit 501 for the capture of the emissions from an exhaust pipe 220 by exhaust pipe connector 510, conveying emissions through emissions duct 520 to purification system 400 for the purification of the emissions. If additional exhaust pipes 220 are selected to be controlled, then the same procedure may be followed using additional emissions processing circuits 501 on the same exhaust capture arm 503. Note that it is anticipated that one to four (or more) emissions processing circuits 501 can be accommodated by a single exhaust capture arm 503, whereby each exhaust pipe connector 510 is individually maneuverable separately from exhaust capture arm 503 for connection to each selected exhaust pipe 220. Once the serviced watercraft 200 is ready to depart, then the reverse procedure is used to detach from exhaust pipe(s) 220, retract and stow exhaust capture system 500, lift the spuds 700 through spudwells 710 using spud drives 720, and move away from serviced vessel 200.

The operation described under FIG. 7 above, is generally the same for FIG. 8, except for the connection of at least one vent 260 as follows. In one exemplary embodiment, once anchored, exhaust capture system 500 is manipulated to bring an exhaust pipe connector 510A to a selected exhaust pipe 220. A second connector 510B is manipulated for attachment to a vent emissions duct 580. Vent emissions duct 580 is manually manipulated along the deck of tanker 200 to a selected vent 260 where a vent connector 570 is placed over vent 260 for capturing emissions from at least one cargo tank on serviced watercraft 200. The emissions from the cargo tank(s) are selected from the group consisting of hydrocarbon fumes from the cargo, exhaust from a boiler, exhaust from an engine, and inert gas. After connecting to at least one emissions source from the group consisting of exhaust pipe 220 and vent 260 of serviced watercraft 200, then emissions are drawn through exhaust capture system 500 and then through purification system 400, thereby purifying the exhaust gas emissions prior to release to the atmosphere. Note that an exemplary embodiment can be configured to process emissions from only boiler emissions, or only auxiliary engine emissions, or only tank vent emissions, or any combination of the three emissions sources.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

CONCLUSION, RAMIFICATIONS, AND SCOPE

The foregoing describes a novel emissions control watercraft (STAXcraft) solving a long-felt but unsolved need that resolves disadvantages associated with prior-art emissions servicing watercraft, the disadvantages selected from the group, but not limited to, the use of tugboats, securing or mooring servicing watercraft alongside a serviced vessel, additional expenses and time-delays and inefficiencies of land-based emissions control systems, inefficient toxic emissions reduction, increased greenhouse gases (GHG) emissions, danger from falling cargo, danger when used with petroleum tankers, danger when used alongside in narrow channels, and the inability to reduce tanker emissions.

The following ramifications have been anticipated by the Applicant:

Alternative anticipated alternative anchoring systems include mooring to anchors placed in a predetermined location on the seafloor, the anchors selected from the group consisting of but not limited to concrete blocks, clump weights, screw anchors, helix anchors, piles, suction piles, drag anchors, torpedo piles, bag anchor systems, concrete footings, vertical load anchors (VLA's), and ground chains.

Electrical generator/genset 932 may be fueled with, but not limited to, e-fuel, biofuel, fossil fuel, or renewable diesel fuel.

Fuel cell system 934 may utilize any chemical energy, including any form of hydrogen, including but not limited to, brown hydrogen, blue hydrogen, and green hydrogen. Fuel cell system 934 may be a proton exchange membrane (PEM or PEMFC) fuel cell, polymer electrolyte membrane fuel cell, a direct methanol fuel cell, an alkaline fuel cell (AFC), a phosphoric acid fuel cell (PAFC), a molten carbonate fuel cell (MCFC), a solid acid fuel cell (SAFC), a solid oxide fuel cell (SOFC), or a reversible fuel cell. Fuel cell system 934 may further include storage tanks for storing compressed gas or liquid.

Energy storage 950 may be, but is not limited to, a lithium-ion battery system, a redox-flow battery system, or a zinc-hybrid battery system, or a reversible fuel cell.

Alternative anticipated alternative anchoring systems include mooring to anchors placed in a predetermined location on the seafloor, the anchors selected from the group consisting of but not limited to concrete blocks, clump weights, screw anchors, helix anchors, piles, suction piles, drag anchors, torpedo piles, bag anchor systems, concrete footings, vertical load anchors (VLA's), and ground chains.

Each processing circuit 501 may be land-based instead of barge-based where it is determined that a land-based system is advantageous in a particular application. Thus, any combination of exhaust pipe 200 and vent 260 may be serviced from a land-based platform instead of a barge-based platform.

Each purification unit 400 may be configured differently when processing emissions from an exhaust pipe 220 versus a vent 260.

Emissions from a vent 260 may alternatively be routed by separate ducting that the ducting of emissions capture system 500. Thus, vent 260 would be connected independently to a purification system 400 with separate ducting or a combination of a vessel diverting ducting system and ducting.

The invention claimed is:

1. An emissions control watercraft for servicing a serviced watercraft, said serviced watercraft stationed at berth or at anchorage, said emissions control watercraft comprising:
   a. a floating platform;
   b. an anchoring system for fixing said floating platform at any predetermined orientation relative to said serviced watercraft without securing to said serviced watercraft, wherein said anchoring system comprises at least one spud attached to said floating platform for anchoring said floating platform, each spud comprising a spud drive, a spudwell and a spud column configured to be raised or lowered within the spudwell by said spud drive, wherein said floating platform is configured for movement along the water with each spud column in a raised position and fixed in a desired position relative to said serviced watercraft with each spud column lowered to and ends thereof embedded in the seabed with the floating platform remaining in a floating condition;
   c. an exhaust capture system for receiving emissions from said serviced watercraft;
   d. a purification system mounted to said floating platform, connected to said exhaust capture system for accepting and purifying said emissions from said exhaust capture system;
   e. said exhaust capture system comprising an exhaust capture arm and an exhaust pipe connector configured to connect to an emissions source of said serviced watercraft, said emissions source selected from the group consisting of an engine exhaust pipe, a boiler exhaust pipe and a cargo tank vent;
   whereby said anchoring system is configured to fix the floating platform at a position and location any distance away from said serviced watercraft which allows interconnection of said exhaust capture system to an emissions source of said serviced watercraft for operation of said purification system to accept and purify said emissions.

2. The emissions control watercraft of claim 1, wherein said floating platform is selected from the group consisting of a barge, a vessel, a self-propelled barge, a semi-submersible watercraft, a boat, and a floating dock.

3. The emissions control watercraft of claim 1, further comprising a plurality of thrusters for propelling said floating platform with each spud column in the raised position, and wherein said thrusters are selected from the group consisting of hydraulic thrusters, electric thrusters, diesel-powered thrusters, gas-powered thrusters, and gasoline-powered thrusters.

4. An emissions capture system for temporarily connecting to a serviced watercraft, said serviced watercraft stationed at berth or at anchor, said emissions capture system comprising:
   a. a plurality of emissions capture circuits;
   b. each emissions capture circuit comprising an emissions duct for receiving emissions from an emissions connector configured to connect to a single exhaust pipe or vent of an emissions source mounted on said serviced watercraft;
   c. said emissions connector configured to connect to said single exhaust pipe or vent of said emissions source selected from the group consisting of an engine exhaust pipe, a boiler exhaust pipe, and a cargo tank vent;
   d. an exhaust capture arm configured to support each emissions duct of said plurality of emissions capture circuits;
   e. said arm mounted on a platform, said platform selected from the group consisting of a floating platform, a barge, a watercraft, a vessel, a wharf, a pier, a dock, a jetty, a slab, and a foundation; and
   f. wherein each emissions connector is configured to be separately maneuverable from the exhaust capture arm for connection to a selected one of an exhaust pipe or vent of a selected emission source on the serviced watercraft.

5. An emissions control system, comprising:
   a serviced watercraft stationed at berth or at anchorage, the serviced watercraft containing a cargo; and
   the emissions control watercraft of claim 1, wherein said distance creates a space between said floating platform and a portion of said serviced watercraft containing the cargo with said space greater than or equal to a size of a portion of said cargo while still allowing the interconnection of said emissions control watercraft with said serviced watercraft, and wherein said location and space are such that said cargo if falling from the serviced watercraft would miss the floating platform.

6. An emissions control system, comprising:
   a serviced watercraft stationed at berth or at anchorage, the serviced watercraft containing a flammable cargo; and
   the emissions control watercraft of claim 1, wherein said distance and location creates a space between said floating platform and a portion of said serviced watercraft containing the flammable cargo while still allowing the interconnection of said exhaust capture system of the emissions control watercraft with the exhaust pipe emissions source of said serviced watercraft, and wherein the location is selected to position the floating platform aft of the serviced watercraft and to avoid any mooring lines between the serviced watercraft and a wharf.

7. The emissions control watercraft of claim 1, wherein said purification system further includes a heater for heating said emissions, said heater being electrically powered.

8. The emissions control watercraft of claim 1, wherein said purification system is powered by a low greenhouse gas emitting power source selected from the group consisting of a hydrogen fuel cell, a genset running on renewable fuel, a solar power system, a rechargeable battery, and a shore power system.

9. A method for purification of exhaust from a serviced watercraft, said watercraft stationed at-berth or at anchorage, the method comprising:
   a. positioning a floating platform at any predetermined orientation near the serviced watercraft, the predetermined orientation including, but not limited to, orientations parallel to and perpendicular to the serviced watercraft;
   b. anchoring said floating platform at a predetermined distance and location away from said serviced watercraft, said anchoring comprising lowering one or more spuds from the floating platform to the seabed, each spud including a spud drive and a spud column which is configured to be raised or lowered by the spud drive, wherein the floating platform is movable along the water with the spud columns in a raised position and fixed in a desired position and orientation relative to the serviced watercraft with the spud columns lowered to and having ends embedded in the seabed such that the floating platform remains in a floating condition;
   c. manipulating an exhaust capture system carried by said floating platform to connect to an emissions source for receiving emissions from an at-berth serviced watercraft, said emissions source selected from the group consisting of an engine exhaust pipe, a boiler exhaust pipe, and a cargo tank vent;
   d. receiving said emissions from said exhaust capture system into a purification system mounted on the floating platform;
   e. purifying said emissions by with said purification system;
   whereby said floating platform may be placed any distance and location away from said serviced watercraft which allows interconnection of said exhaust capture system to said emissions source of said serviced watercraft, said position and location including one or more of (i) a position and location creating a space between said floating platform and a portion of said serviced watercraft such that cargo falling from the serviced watercraft would miss the floating platform and (ii) a position and location selected to position the floating platform aft of the serviced watercraft and to avoid any mooring lines between the serviced watercraft and a wharf.

10. The method of claim 9, wherein said floating platform is selected from the group consisting of a barge, a self-propelled barge, a vessel, a self-propelled vessel, a semi-submersible watercraft, a boat, and a floating dock.

11. The method of claim 9, further comprising using thrusters onboard the floating platform to move the floating platform through water, wherein said thrusters are selected from the group consisting of hydraulic thrusters, electric thrusters, diesel-powered thrusters, gas-powered thrusters, and gasoline-powered thrusters.

12. The method of claim 9, wherein said manipulating the exhaust capture system comprises connecting the exhaust capture system to a cargo tank vent on a deck of the serviced watercraft.

13. The method of claim 9, wherein anchoring said floating platform comprises anchoring said floating platform at the predetermined location and at said distance and location to create a space between said floating platform and a portion of said serviced watercraft containing a cargo with said space greater than or equal to a size of a portion of said cargo while still allowing the interconnection of said floating platform with said serviced watercraft, and wherein said location and space are such that said cargo if falling from the serviced watercraft would miss the floating platform.

14. The method of claim 9, wherein the watercraft is a watercraft carrying a flammable cargo, and anchoring said floating platform comprises anchoring said floating platform at the predetermined location and at said distance and location to create a space between said floating platform and a portion of said serviced watercraft containing the flammable cargo while still allowing interconnection of said exhaust capture system of the floating platform with the emissions source of said serviced watercraft, and wherein the location is selected to position the floating platform aft of the serviced watercraft and to avoid any mooring lines between the serviced watercraft and a wharf.

15. The method of claim 9, wherein said purification system further includes a heater for heating said emissions, said heater being electrically powered.

16. The method of claim 9, further comprising:
powering said purification system by a low greenhouse gas emitting power source selected from the group consisting of at least one hydrogen fuel cell, at least one genset running on renewable fuel, at least one solar power system, at least one rechargeable battery, and a shore power system.

17. The emissions control watercraft of claim 3, wherein said plurality of thrusters include thruster units configured to rotate a direction of thrust.

18. The emissions control watercraft of claim 3, wherein said thrusters are electrically powered.

19. The method of claim 11, wherein said using thrusters to move a floating platform through water without assistance from tugboats and positioning said floating platform at any predetermined orientation near a serviced watercraft at berth comprises:
rotating a direction of thrust of said thrusters.

20. The method of claim 11, wherein said thrusters are electrically powered.

21. The emissions control watercraft of claim 1, wherein the exhaust pipe connector is configured to connect to a single exhaust pipe or vent of the emissions source of the serviced watercraft vehicle.

22. The method of claim 9, wherein said manipulating an exhaust capture system comprises connecting the exhaust capture system to a single exhaust pipe or vent of the emissions source of the serviced watercraft.

23. An emissions control system comprising:
an ocean-going vessel (OGV) stationed at berth or at anchorage; and
an emission control watercraft comprising:
a. a floating platform;
b. an anchoring system for fixing said floating platform at any predetermined orientation relative to said OGV without securing to said OGV;
c. an exhaust capture system for receiving emissions from said OGV;
d. a purification system mounted to said floating platform, connected to said exhaust capture system for accepting and purifying said emissions from said exhaust capture system;
e. said exhaust capture system comprising an exhaust capture arm and an exhaust pipe connector configured to connect to an emissions source of said OGV, said emissions source selected from the group consisting of an engine exhaust pipe, a boiler exhaust pipe and a cargo tank vent;
whereby said emissions control watercraft is configured for anchoring by said anchoring system any distance away from said OGV which allows interconnection of said exhaust capture system to an emissions source of said OGV for operation of said purification system to accept and purify said emissions; and
wherein said anchoring system comprises a plurality of spuds attached to said floating platform for anchoring said floating platform at any predetermined orientation relative to said serviced OGV, each spud including a spud drive and a spud column which is configured to be raised or lowered by said spud drive, wherein said floating platform is is configured for movement along the water with the spud columns in a raised position and fixed in a desired position fixed relative to said serviced OGV with the spud columns lowered to and spud column ends embedded in the seabed, with the floating platform remaining in a floating condition.

24. The emissions control watercraft of claim 1, wherein the spud drive includes a winch and a cable attached to a foot of the spud column, and the spud drive is configured to lower the spud column by gravity by allowing the cable to pay out.

25. The system of claim 4, further comprising a plurality of purification circuits each connected to a respective one of the emission capture circuits and comprising a purification unit.

26. The emissions control system of claim 23, wherein each spud drive includes a winch and a cable attached to a foot of the spud column, and the spud drive is configured to lower the spud column by gravity by allowing the cable to pay out.

27. The emissions control system of claim 23, further comprising:
a plurality of thrusters for propelling said floating platform.

* * * * *